July 1, 1969
D. HUGHSON
3,452,620
DOUBLE MESH, CROSS AXIS GEARING
Filed Feb. 29, 1968
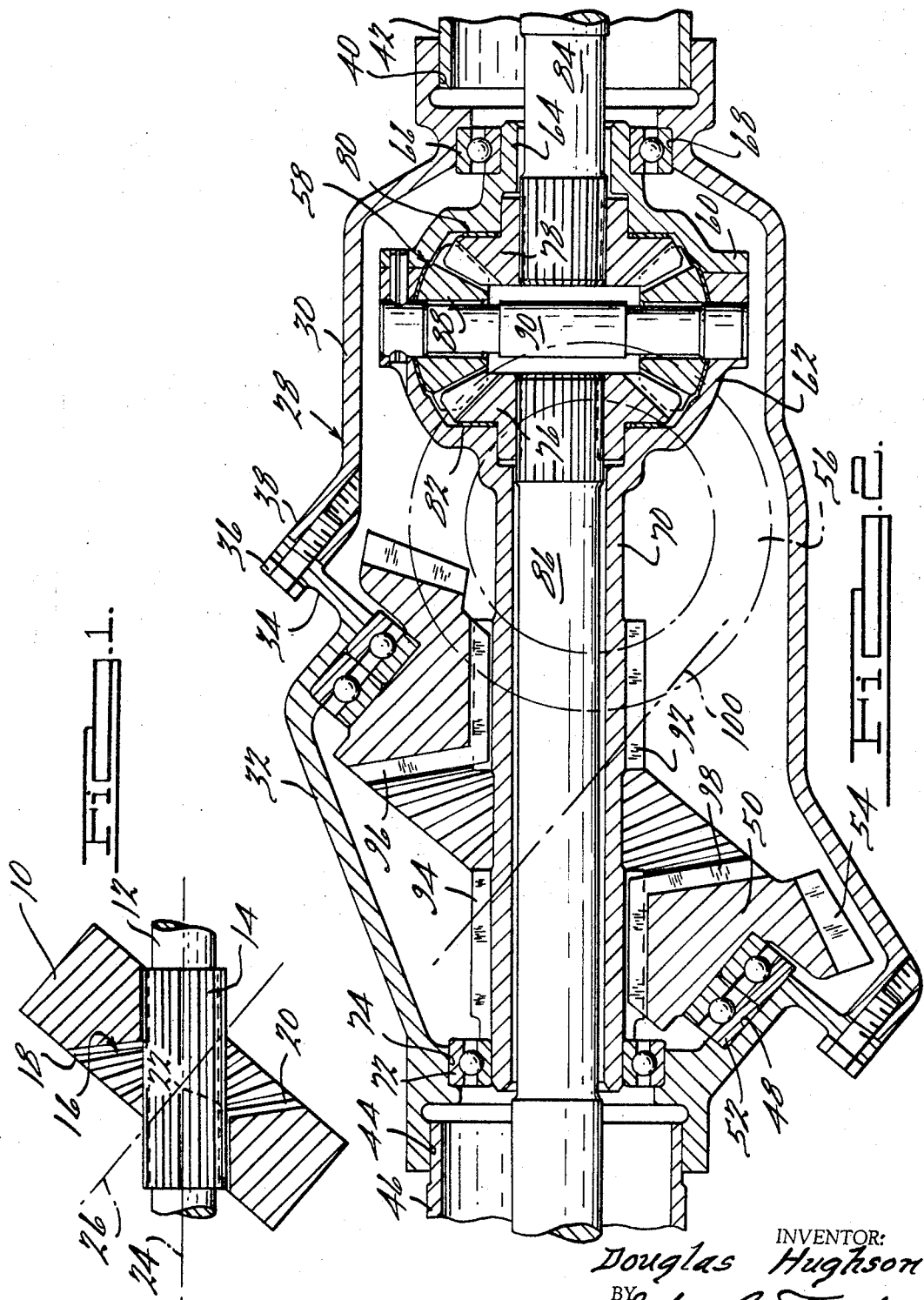
INVENTOR:
Douglas Hughson
BY
ATTORNEYS.

United States Patent Office 3,452,620
Patented July 1, 1969

3,452,620
DOUBLE MESH, CROSS AXIS GEARING
Douglas Hughson, Southfield, Mich., assignor to Ford Motor Company, Dearborn, Mich., a corporation of Delaware
Filed Feb. 29, 1968, Ser. No. 709,383
Int. Cl. F16h 1/14; B23f 9/04
U.S. Cl. 74—713    4 Claims

ABSTRACT OF THE DISCLOSURE

This specification discloses torque delivery gearing including meshing driving and driven gears with their respective axes disposed angularly with respect to each other. Conjugate teeth for the respective gears are adapted to mesh at two contact points situated 180° out of position.

Brief summary of the invention

The gearing of my invention comprises a cross-axis drive having an internal gear situated in meshing engagement with an external gear. It is an improvement in constructions such as that shown in U.S. Patent No. 2,949,041. The rotary axis of the internal gear of my invention is disposed at an angle with respect to the axis of the external gear. The internal gear has chevron-shaped or curved internal teeth. One side of each internal gear tooth meshes at a first point of contact with the external gear, and the other side of that same internal tooth meshes at a second contact point with the external gear. The contact points are situated 180° apart with respect to the axis of the internal gear and are axially spaced with respect to the internal gear axis.

The gear tooth loading developed by the driving torque at any contact point thus is one-half of the gear tooth loading that would be developed if only a single contact were made between the conjugate gears. This results in a more efficient torque delivery path, and it is possible to use smaller gear elements because of the reduced torque loads involved. The bearing loads also are reduced since the gear tooth reaction forces at one contact point will substantially balance the gear tooth contact forces at the other contact point.

The compound internal gear teeth can be formed by means of a cutter on a gear shaping machine by reciprocating an external, conjugate-form cutting tool into the gear blank for the internal gear as the latter is tilted on its axis. As the cutting tools is rotated slowly about its axis during the cutting operation, the internal teeth on the gear blank are generated.

The conjugate tooth form on the cutting tool may be made of a geometry similar to the geometry of the external gear teeth so that optimum geometry for the resultant internal and external gear parts are achieved.

Brief description of the figures of the drawing

FIGURE 1 shows in schematic form an assembly of an internal gear and an external gear embodying some of the characteristics of my invention; and FIGURE 2 shows a geared differential drive for an automotive vehicle driveline in which the driving pinion and the ring gear for the differential carrier are formed with the gear characteristics illustrated in FIGURE 1.

Particular description of the invention

In FIGURE 1 numeral 10 designates an internal gear which may be the driven gear, and numeral 12 designates an external gear, which may be the driving gear. The driving gear is formed with straight external teeth 14, which may be spur gear teeth or helical gear teeth. The internal gear has chevron-shape or curved teeth identified generally by reference character 16. These teeth are formed in two sections identified separately by reference characters, 18 and 20. The teeth of tooth section 18 intersect the teeth of tooth section 20 at a central apex 22.

The axis 24 of the gear 12 is angularly displaced with respect to the axis 26 of the driven gear 10. The gear teeth 14 mesh with the internal gear section 18 on one side of the axis 24, and they mesh with the internal gear section 20 on the opposite side of the axis 24. Thus there are two gear tooth meshes that are effective to deliver torque continuously as one gear drives the other.

FIGURE 2 shows a working embodiment of the gearing arrangement shown in FIGURE 1. It is a geared differential mechanism for use in an automotive vehicle driveline. It comprises a differential housing 28 having a first section 30 and a second section 32. A flange 34 formed on the housing section 32 is bolted by bolts 36 to cooperating boss 38 formed on the housing section 30.

The right-hand end of the housing section 30 is opened at 40 to receive one end of an axle sleeve housing extension 42. The left-hand end of the housing section 32 similarly is formed with an opening 44, which receives an end of an axle sleeve housing 46. Housing section 32 is formed with an enlarged portion 48 having an axis that is angularly displaced with respect to the axis of the opening 44.

Journalled in bearing opening 48 is differential ring gear 50, a pair of ball bearings 52 being provided for this purpose. The ring gear 50 has formed thereon hypoid bevel gear teeth 54 on its outer periphery. These engage a cooperating drive pinion shown in phantom form at 56. This pinion can be connected drivably in the usual fashion to the driveshaft in an automotive vehicle driveline.

A differential carrier 58 is journalled rotatably within the housing 28. It is formed in two parts 60 and 62. These are secured together by bolts in the usual fashion. Housing part 58 has an axially extending hub 64 which is journalled by means of bearing 66 within bearing opening 68 formed in the right-hand end of the housing section 30.

Housing portion 62 is connected to a sleeve 70. This sleeve extends through the housing section 32 and is journalled at its left-hand end by means of bearing 72 within bearing opening 74 formed in the housing section 32.

A pair of side gears 76 and 78 is situated within the carrier housing 58. Side gear 78 is a bevel gear with a shoulder 80 which engages a reaction shoulder formed on the carrier housing portion 60. Gear 76 also is a bevel gear, and it includes a shoulder 82 which engages a reaction shoulder formed on the housing portion 62. Gear 78 is internally splined to axle shaft 84. Gear 76 is internally splined to axle shaft 86. Both axle shafts are coaxially disposed within the housing 28. Shaft 84 extends through the housing extension sleeve 42 and the shaft 86 extends to the housing extension sleeve 46. The vehicle traction wheels are drivably connected to the outboard ends of the shaft 84 and 86.

Differential pinions 88 are journalled within the housing 58 in meshing engagement with gears 76 and 78. They are journalled rotatably on pinion shaft 90, which is end-supported by the housing portions 60 and 62.

Sleeve 70 is formed with an external gear which can be machined in two tooth sections identified separately by reference characters 92 and 94. I contemplate, however, that each gear tooth 92 and 94 may in fact be one continuous straight gear tooth, either helical or spur.

Ring gear 50 defines an internal gear having teeth 96 and 98. Each tooth 96 registers with one of the teeth 98 to form a continuous but curved gear tooth. The teeth 98 mesh with the teeth 92, and the teeth 96 mesh with the teeth 94. As the gear 50 rotates about its axis 100, torque is distributed from the gear 50 to sleeve 70 through two meshes. An efficient driving connection thus is established with a minimum space requirement.

In machining the internal gear, an external, conjugate-tooth gear cutter may be mounted on a gear-shaper machine. The gear blank, which is internally bored, is mounted in the path of motion of the tool in a plane perpendicular to the direction of motion of the tool. The tool is reciprocated without rotation until it forms one internal tooth. The workpiece then is tilted so that its principal axis forms the desired angle with respect to the axis of the tool. The tool then is rotated as it is reciprocated in its cutting motion. This drives the workpiece in its tilted plane thereby generating the chevron-shaped or curved internal teeth.

The tool itself is similar in form and in geometry to the form and geometry of the external gear with which the internal gear is to be used. Perfect conjugate registry of one gear with respect to the other thus is achieved.

Prior to the cutting operation, care must be taken to choose the correct angle of inclination, the correct circular pitch and other appropriate gear parameters in order that the cutting action on one side of the cutting tool will complement the cutting action on the opposite side and in order to locate precisely each tooth space in registry with the cutting tooth of the tool after the gear blank has made one complete revolution.

Having thus described a preferred form of my invention, what I claim and desire to secure by U.S. Letters Patent is:

1. Cross axis gearing comprising an internal gear and an external gear, the internal gear being mounted for rotation about an axis that is angularly offset from the axis of said external gear, said internal gear having internal teeth that are comprised of angularly spaced tooth portions, one tooth portion being situated on one axial side of said internal gear and the other tooth portion being situated on the other side thereof, said internal gear meshing with one internal tooth portion at a first gear tooth contact point and meshing with said other internal gear tooth portion at a second gear tooth contact point situated 180° out of phase with respect to the first gear tooth contact point.

2. Cross axis gearing comprising an internal gear and an external gear, the internal gear being mounted for rotation about an axis that is angularly offset from the axis of said external gear, said internal gear having internal teeth that are comprised of angularly spaced tooth portions, one tooth portion being situated on one axial side of said internal gear and the other tooth portion being situated on the other side thereof, said internal gear meshing with one internal tooth portion at a first gear tooth contact point and meshing with said other internal gear tooth portion at a second gear tooth contact point situated 180° out of phase with respect to the first gear tooth contact point, each internal tooth portion of said internal gear including gear teeth that intersect a companion gear tooth on the other gear tooth portion at a central apex, the plane in which said apices are situated including the point of intersection of the gear axes.

3. A geared differential drive for delivering torque from a power input member to each of two axially aligned axle shafts including a differential housing, a differential carrier rotatably journalled in said housing, side gears in said differential carrier, one axle shaft being connected to one side gear and the other axle shaft being connected to the other side gear, differential pinions carried by said carrier in meshing engagement with said side gears, the carrier driving gear being journalled for rotation in said housing about an axis that is angularly displaced with respect to the axis of said axle shafts, internal gear teeth in said driving gear, an external gear journalled rotatably for rotation about the axis of said axle shafts, the teeth of said internal gear being curved with one tooth portion thereof situated in meshing engagement with said external gear at one axial location thereon and with another tooth portion thereof situated in meshing engagement with a second axially spaced portion of said external gear, the points of meshing engagement between said external gear and said internal gear being situated 180° out of position with respect to each other.

4. A method for cutting an internal gear having chevron-shaped teeth comprising the steps of mounting an internal gear blank in a fixed position, mounting an external, conjugate, gear tooth cutter for reciprocation in the direction of the axis of said gear blank, cutting one gear tooth on said blank with the cutter reciprocating in the direction of the axis of said blank, tilting the axis of said blank relative to the axis of said cutter, and rotating said cutter about its axis as it continues to reciprocate in the direction of its axis until the full number of internal gear teeth are generated.

References Cited
UNITED STATES PATENTS

| | | | |
|---|---|---|---|
| 2,974,534 | 3/1961 | Clickner | 74—416 X |
| 3,318,173 | 5/1967 | Puidokas | 74—713 |

LEONARD H. GERIN, *Primary Examiner.*

U.S. Cl. X.R.

74—413, 416, 424; 90—8